(12) United States Patent
Kumagai

(10) Patent No.: US 11,747,759 B2
(45) Date of Patent: Sep. 5, 2023

(54) IMAGE FORMING APPARATUS HAVING A MOTOR TO DRIVE A PICKUP ROLLER

(71) Applicant: CANON KABUSHIKI KAISHA, Tokyo (JP)

(72) Inventor: Shigemi Kumagai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/684,081

(22) Filed: Mar. 1, 2022

(65) Prior Publication Data
US 2022/0291617 A1     Sep. 15, 2022

(30) Foreign Application Priority Data
Mar. 12, 2021   (JP) ................. 2021-040472

(51) Int. Cl.
*G03G 15/00*     (2006.01)
*H02P 6/18*      (2016.01)

(52) U.S. Cl.
CPC ..... *G03G 15/5008* (2013.01); *G03G 15/6552* (2013.01); *G03G 15/80* (2013.01); *H02P 6/186* (2013.01)

(58) Field of Classification Search
USPC ........................................ 399/167
See application file for complete search history.

(56) References Cited

U.S. PATENT DOCUMENTS

| | | | |
|---|---|---|---|
| 2015/0145454 A1 | 5/2015 | Kameyama | |
| 2019/0356252 A1* | 11/2019 | Kameyama | ............. H02P 6/186 |
| 2019/0393812 A1* | 12/2019 | Kameyama | ............. G03G 15/80 |
| 2020/0235684 A1* | 7/2020 | Maeda | ............... G03G 15/5008 |
| 2020/0235689 A1* | 7/2020 | Miyashita | ............... H02P 23/14 |

* cited by examiner

*Primary Examiner* — Quana Grainger
(74) *Attorney, Agent, or Firm* — Canon U.S.A., Inc. I.P. Division

(57) ABSTRACT

An image forming apparatus includes a stacking unit, a pickup roller, a motor having a winding, a rotor, and a phase, an image forming unit, an operation unit, and a receiving unit. The motor drives the pickup roller to feed a recording medium stacked on the stacking unit. The image forming unit forms an image on the fed medium. A user operates the operation unit to set an image forming condition. When, in a state where the winding is not excited, the operation unit is operated before the receiving unit receives an instruction to start forming the image, an initial operation is executed in a rotor stop state that supplies current to the winding and determines the motor phase based on the current flowing through the winding. When the instruction is received after the initial operation, the winding receives current such that the rotor rotates based on the determined phase.

18 Claims, 10 Drawing Sheets

IMAGE FORMING APPARATUS HAVING A MOTOR TO DRIVE A PICKUP ROLLER

BACKGROUND

Field

The present disclosure relates to controlling of a motor in an image forming apparatus.

Description of the Related Art

When a brushless DC motor is started, it is known to estimate a stop position of a rotor of the brushless DC motor based on a change in inductance depending on a rotor position. U.S. Patent Application Pub. No. 2015/0145454 discloses a technique of estimating the initial position of a rotor based on the responsiveness of a current when a voltage is applied to a winding of a brushless DC motor and starts driving the brushless DC motor based on the estimated initial position.

The operation of estimating the initial position takes a particular time. In a conventional image forming apparatus, an operation of estimating an initial position is performed after an instruction is input to start a job of forming an image on a recording medium. That is, in the conventional image forming apparatus, a time needed to perform the operation of estimating the initial position causes an increase in an FPOT (First Print Output Time), which is a time from the start of the job until the recording medium is output.

SUMMARY

There has been a demand for a technique of further shortening the FPOT in the image forming apparatus. The present disclosure provides an image forming apparatus capable of shortening the FPOT.

According to an aspect of the present disclosure, an image forming apparatus includes a stacking unit on which a recording medium is to be stacked, a pickup roller configured to feed the recording medium stacked on the stacking unit, a motor configured to drive the pickup roller, an image forming unit configured to form an image on the recording medium fed by the pickup roller, an operation unit configured to be used by a user to set a condition of the image forming performed by the image forming unit, a receiving unit configured to receive an instruction to start forming the image by the image forming unit, and a controller configured to control, wherein, in a case where the operation unit is operated before the receiving unit receives the instruction in a state where a winding of the motor is not excited, the controller executes an initial operation to supply current to the winding of the motor in a stop state in which a rotor of the motor is at stop and to determine a phase of the rotor having been in the stop state based on the current flowing through the winding, and wherein, in a case where the receiving unit receives the instruction after the initial operation, the controller controls the current to be supplied to the winding such that the rotor having been in the stop state rotates based on the phase determined in the initial operation.

Further features of the present disclosure will become apparent from the following description of exemplary embodiments with reference to the attached drawings.

DESCRIPTION OF THE EMBODIMENTS

Embodiments of the present disclosure are described below with reference to the drawings. Note that the shapes of the components, their relative positions, and the like described in the following embodiments can be properly changed depending on the configuration of the specific apparatus to which the present disclosure is applied and various conditions, and the scope of the present disclosure is not limited by the following embodiments.

First Embodiment

Image Forming Apparatus

Figure 1:
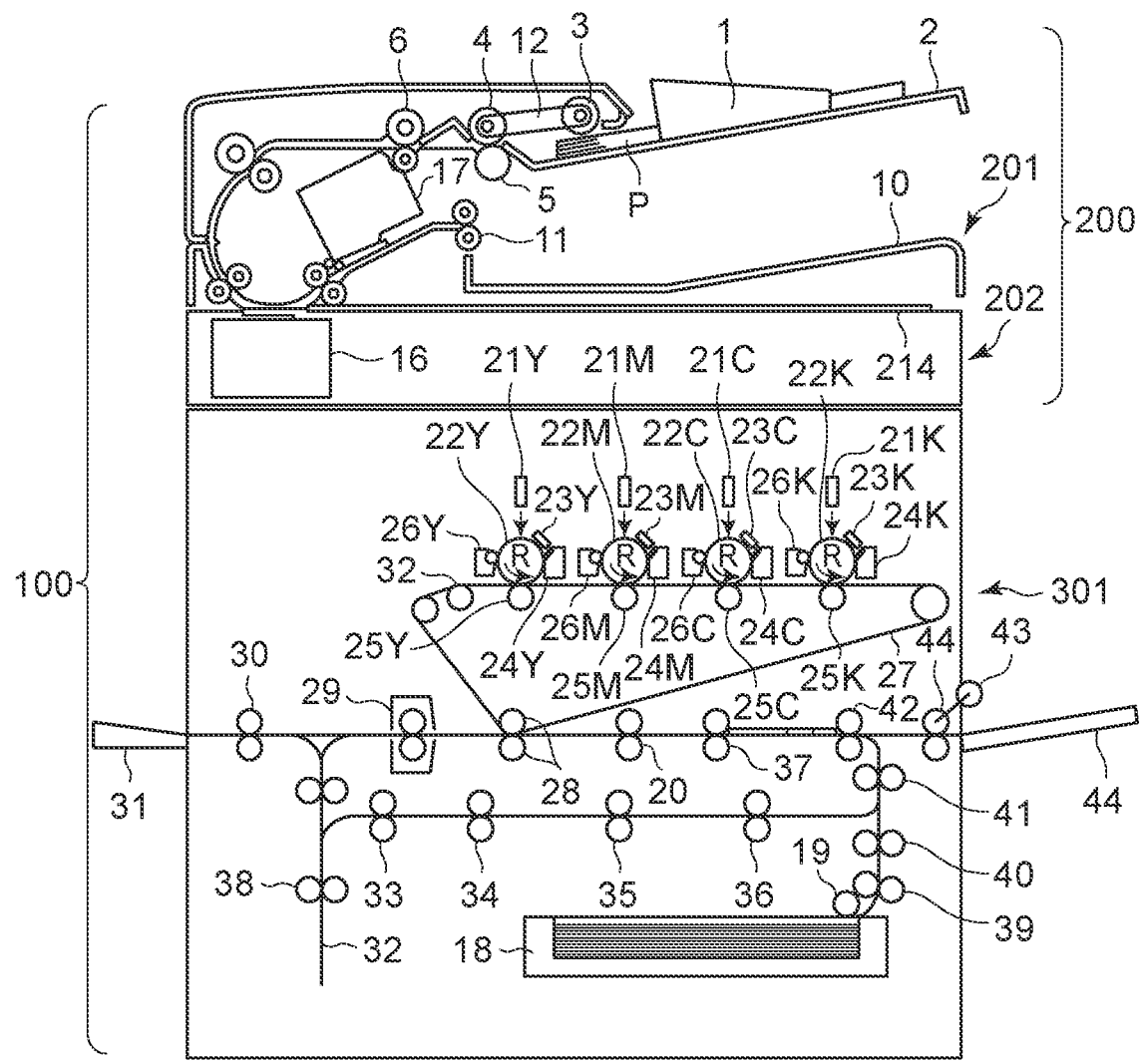
FIG. 1 is a cross-sectional view showing an image forming apparatus.

FIG. 1 is a cross-sectional view showing a configuration of a color electrophotographic copying machine (hereinafter referred to as an image forming apparatus) 100 according to a first embodiment. The image forming apparatus is not limited to the copying machine. For example, the image forming apparatus may be a facsimile apparatus, a printing machine, a printer, or the like. The image forming method is not limited to the electrophotographic method, and other methods such as an inkjet method or the like may be employed. The type of the image forming apparatus may be either a monochrome type or a color type.

The configuration and the function of the image forming apparatus 100 are described below with reference to FIG. 1. As shown in FIG. 1, the image forming apparatus 100 includes a document reading apparatus 200 and an image printing apparatus 301, wherein the document reading apparatus 200 includes a document feeding apparatus 201 and a reading apparatus 202.

Document Reading Apparatus

Documents P stacked on a document stacking part 2 of the document feeding apparatus 201 are fed one by one by a pickup roller 3, and then further fed downstream by a feed roller 4. A separation roller 5 is disposed at a position facing the feed roller 4 such that the separation roller 5 is in pressure contact with the feed roller 4. The separation roller 5 is configured to rotate when a load torque equal to or higher than a predetermined torque is applied to the separation roller 5, and has a function of separating documents apart when two documents are fed together.

The pickup roller 3 and the feed roller 4 are connected by a swing arm 12. The swing arm 12 is supported by a rotating shaft of the feed roller 4 such that the swing arm 12 can rotate about the rotating shaft of the feed roller 4.

Each document P is transported by the feed roller 4 and the like, and is discharged to a discharge tray 10 by a discharge roller 11.

The reading apparatus 202 includes a document reading unit 16 configured to read an image on a first surface of the transported document. Image information obtained as a result of reading by the document reading unit 16 is output to the image printing apparatus 301.

The document feeding apparatus 201 includes a document reading unit 17 for reading an image on a second surface of the transported document. Image information obtained as a result of reading by the document reading unit 17 is output to the image printing apparatus 301 to a similar manner to the above-described manner performed in the document reading unit 16.

The document reading operation is performed in the manner described above.

Two document reading modes are available, which are a first reading mode, and second reading mode. In the first reading mode, an image of a document transported in the abode-described manner is read. In the second reading mode, an image of a document placed on document glass 214 of the reading apparatus 202 is read by the document reading unit 16 as the document reading unit 16 moves at a specific fixed speed. Usually, an image of a sheet-shaped document is read in the first reading mode, while an image of a page of a book, a booklet, or the like is read in the second reading mode.

Image Printing Apparatus

Inside the image printing apparatus 301, a sheet storage tray 18 for storing a recording medium is disposed. The recording medium refers to a medium on which an image is formed by the image forming apparatus. Examples of a recording medium include paper, a plastic sheet, a cloth, an overhead projector (OHP) sheet, a label, and the like.

The recording medium P stored in the sheet storage tray 18 is sent out by a pickup roller 19 and is transported to a registration roller 20 by transport rollers 39, 40, 41, and 42, and the like.

The image printing apparatus 301 has a manual feed tray 44 for stacking a recording medium. The recording medium stacked on the manual feed tray 44 is sent by a pickup roller 43, and is further sent to the registration roller 20 by the transport roller 42 and the like.

When the recording medium is transported by a pre-registration roller 37, the leading end of the recording medium is struck against the registration roller 20. As a result, a loop is formed in the recording medium between the registration roller 20 and the pre-registration roller 37, and a skew of the recording medium is corrected (reduced).

The image signal output from the document reading apparatus 200 is input to the optical scanning apparatuses 21Y, 21M, 21C, and 21K including the semiconductor laser and the polygon mirror for each color component. Specifically, the image signal related to yellow output from the document reading apparatus 200 is input to the optical scanning apparatus 3Y, and the image signal related to magenta output from the document reading apparatus 200 is input to the optical scanning apparatus 3M. Further, the image signal related to cyan output from the document reading apparatus 200 is input to the optical scanning apparatus 3C, and the image signal related to black output from the document reading apparatus 200 is input to the optical scanning apparatus 3K. In the following description, a process and associated parts of the image forming apparatus will be described for a case in which the a yellow image is formed. Note that images of other colors of magenta, cyan, and black are formed by a similar process.

The outer peripheral surface of a photosensitive drum 22Y is charged by a charger 23Y. After the outer peripheral surface of the photosensitive drum 22Y is charged, a laser beam is emitted according to the image signal input from the document reading apparatus 200 to the optical scanning apparatus 21Y and is transmitted from the optical scanning apparatus 21Y via an optical system such as a polygon mirror and a mirror such that the outer peripheral surface of the photosensitive drum 22Y is irradiated by the laser beam. As a result, an electrostatic latent image is formed on the outer peripheral surface of the photosensitive drum 22Y.

Subsequently, the electrostatic latent image is developed by toner of the developer 24Y in a developing unit. As a result, a toner image is formed on the outer peripheral surface of the photosensitive drum 22Y. The toner image formed on the photosensitive drum 22Y is transferred to a transfer belt 27 serving as an intermediate transfer element via a transfer roller 25Y disposed at a position facing the photosensitive drum 22Y. The toner remaining on the outer peripheral surface of the photosensitive drum 22Y after the toner image is transferred to the transfer belt 27 is recovered by a cleaning unit 26Y.

The yellow, magenta, cyan, and black toner images transferred to the transfer belt 27 are transferred to the recording medium P by transfer roller pairs 28. The transfer roller pair 28 is applied with a high voltage, which causes the toner image to be transferred to the recording medium. To make it possible for the recording medium P to be subjected to the image transfer process described above, a registration roller 20 feeds, at a proper timing, the recording medium P to the transfer roller pairs 28.

After the toner image is transferred to the recording medium P in the above-described manner, the recording medium P is sent to a fixing unit 29. The recording medium P is heated and pressurized by the fixing unit 29 to fix the toner image on the recording medium P. Thus, the image is formed on the recording medium P by the image forming apparatus 100 in the above-described manner.

An image is formed in a one-side printing mode, after a recording medium is passed through the fixing unit 29, the recording medium is discharged to the discharge tray 31 by the discharge roller 30. When an image is formed in a duplex printing mode, after the fixing process on the first surface of the recording medium is performed by the fixing unit 29, the recording medium is transported to a reverse path 32 by the reverse roller 38. When the recording medium is transported to the reverse path 32, the first and second sides of the recording medium are reversed by a reverse roller 38, and the recording medium is transported to a transport guide provided with transport rollers 33, 34, 35, and 36. The recording medium is transported to the registration roller 20 again by the transport rollers 33, 34, 35, and 36 and the like, and an image is formed on the second surface of the recording medium by the method described above. Thereafter, the recording medium is discharged to the discharge tray 31 by the discharge roller 30.

The configuration and the function of the image forming apparatus 100 have been described above.

Control Configuration of Image Forming Apparatus

Figure 2:
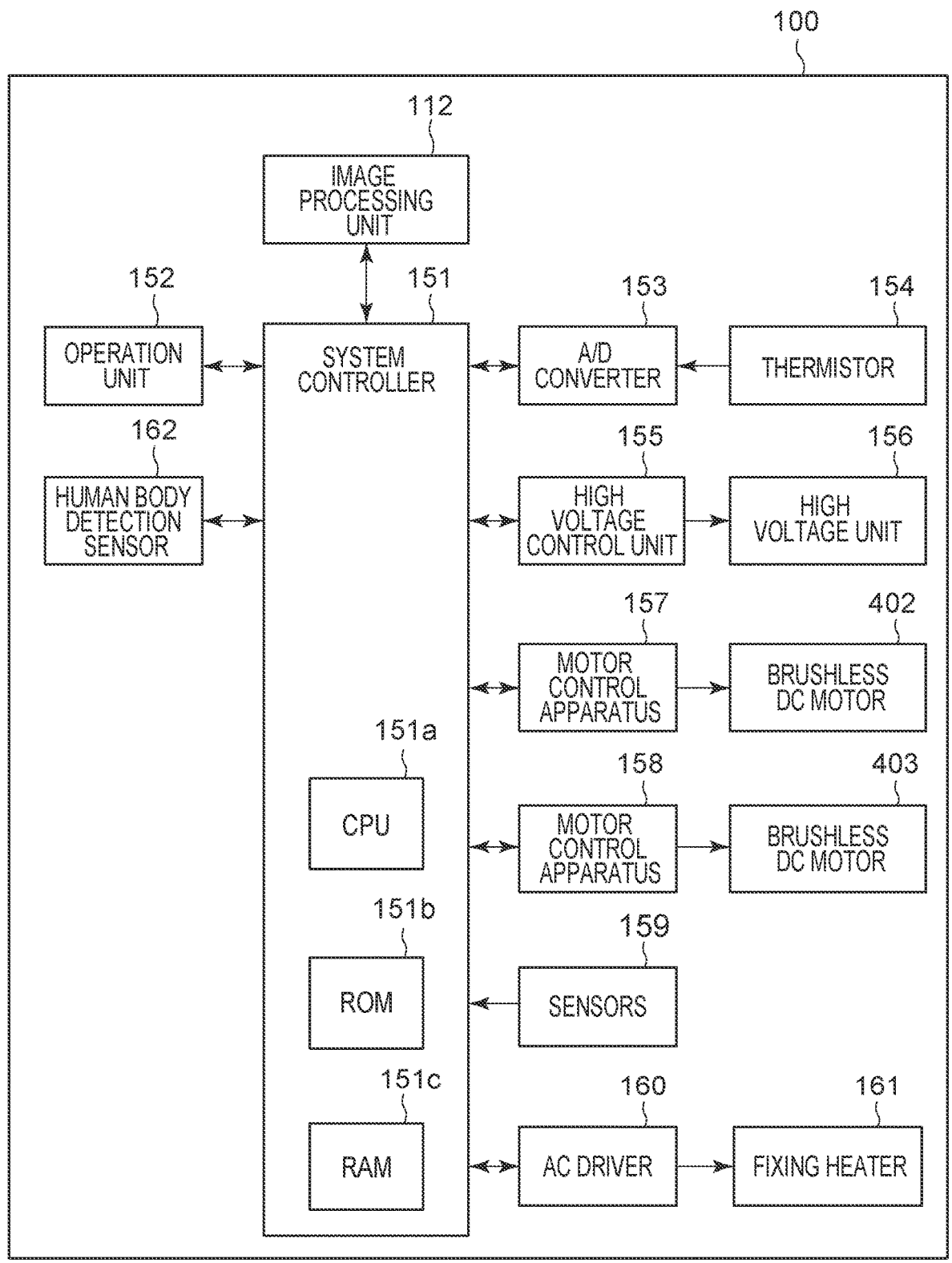
FIG. 2 is a block diagram showing a control configuration of an image forming apparatus.

FIG. 2 is a block diagram showing an example of a control configuration of the image forming apparatus 100. As shown in FIG. 2, a system controller 151 includes a CPU 151*a*, a ROM 151*b*, and a RAM 151*c*. The system controller 151 is connected to an image processing unit 112, an operation unit 152, an analog/digital (A/D) converter 153, a high voltage control unit 155, a motor control apparatuses 157 and 158, sensors 159, and an AC driver 160. The system controller 151 can transmit and receive data, a command, and the like to and from each connected unit.

The CPU 151a executes various processes related to a predetermined image formation sequence by reading and executing various programs stored in the ROM 151b.

The RAM 151c is a storage device. The RAM 151c stores, for example, various data such as a set value for the high voltage control unit 155, a command value for the motor control apparatuses 157 and 158, and information received from the operation unit 152.

The system controller 151 transmits the set value data for various apparatuses disposed in the image forming apparatus 100, which is necessary for the image processing performed by the image processing unit 112, to the image processing unit 112. The system controller 151 also receives signals from the sensors 159 and sets set values for the high voltage control unit 155 based on the received signals.

The high voltage control unit 155 supplies voltages to high voltage units 156 (chargers 23Y, 23M, 23C, and 23K, developers 24Y, 24M, 24C, and 24K, transfer roller pairs 28, etc.) according to the set values set by the system controller 151.

The motor control apparatus 157 controls a brushless direct current (DC) motor 402 according to a command output from the CPU 151a. The motor control apparatus 158 controls a brushless DC motor 403 according to a command output from the CPU 151a. Although only two motor control apparatuses are shown in FIG. 2, the image forming apparatus may include three or more motor control apparatuses. Only two motors are shown in FIG. 2, but the image forming apparatus actually includes three or more motors. One motor control apparatus may control a plurality of motors.

The A/D converter 153 receives a detection signal output by a thermistor 154 for detecting the temperature of the fixing heater 161, converts the detection signal from an analog signal to a digital signal, and transmits the resultant detection signal to the system controller 151. The system controller 151 controls the AC driver 160 based on the digital signal received from the A/D converter 153. The AC driver 160 controls the fixing heater 161 such that the fixing heater 161 has a proper temperature at which the fixing process is performed. The fixing heater 161 is a heater used in the fixing process, and is included in the fixing unit 29.

The system controller 151 controls the operation unit 152 to display an operation screen for use by a user to set an image forming condition such as specifying a type of recording medium to be used (hereinafter referred to as a paper type) on a display unit provided on the operation unit 152. The system controller 151 receives information set by the user from the operation unit 152, and controls the operation sequence of the image forming apparatus 100 based on the information set by the user. The system controller 151 transmits information indicating the state of the image forming apparatus to the operation unit 152. The information indicating the state of the image forming apparatus is, for example, information regarding the number of images formed, the status of the progress of the image forming operation, an occurrence of a jam or double feeding of sheets in a document reading apparatus 201 or the image printing apparatus 301. The operation unit 152 displays the information received from the system controller 151 on the display unit. Note that in the present embodiment, during a period in which the operation unit 152 is being operated, setting data or the like input in the operation unit 152 is transmitted from the operation unit 152 to the CPU 151a at predetermined time intervals.

In the present embodiment, the image forming apparatus 100 includes a human body detection sensor 162. The human body detection sensor 162 includes an array of infrared sensors sensitive to an infrared ray for detecting a person by sensing an infrared ray radiated from the person. The human body detection sensor (the human sensor) 162 transmits the detection result to the CPU 151a.

Figure 3:
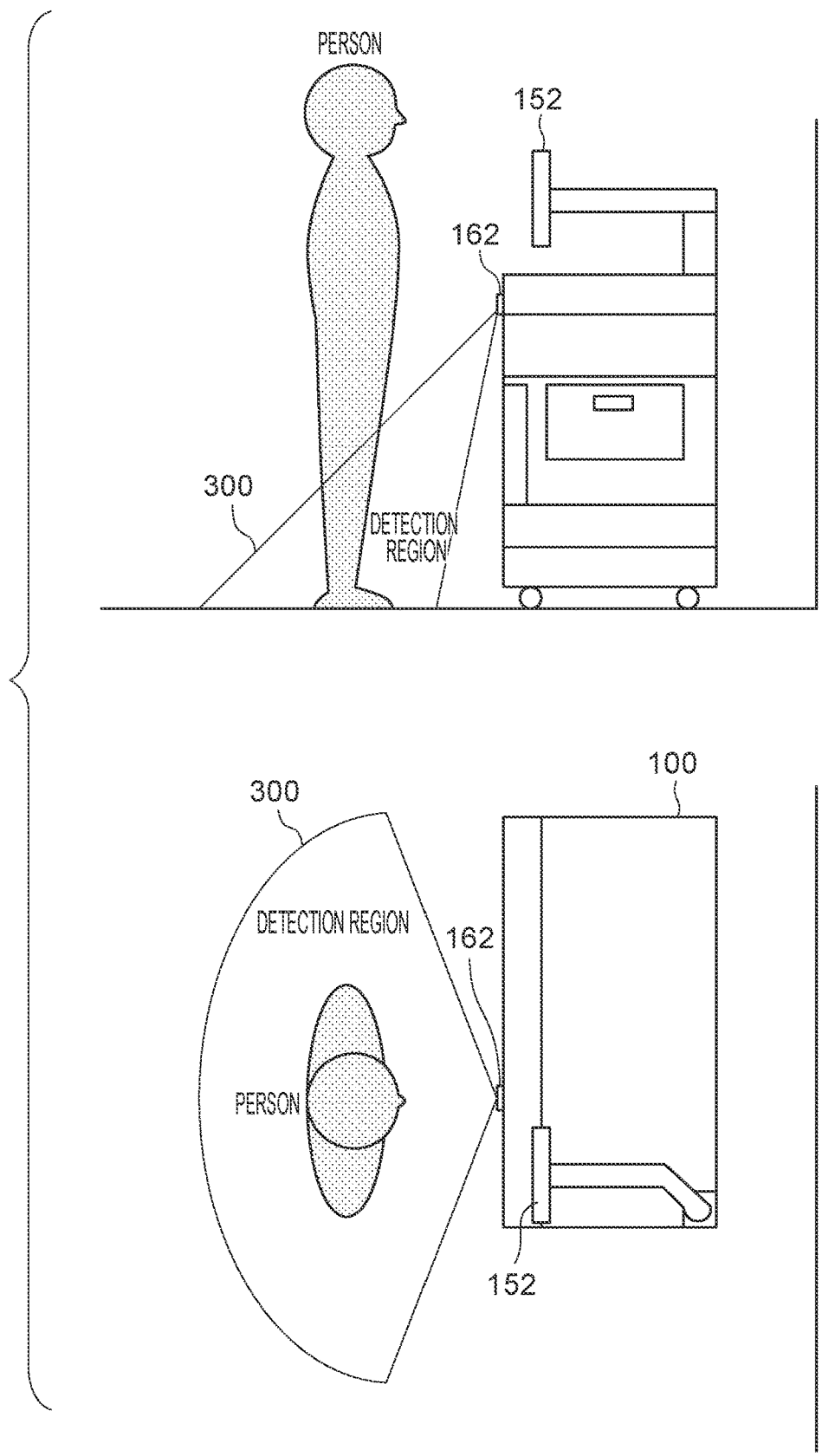
FIG. 3 is a diagram showing a detection region of a human body detection sensor.

FIG. 3 is a diagram illustrating a detection region of the human body detection sensor 162. The human body detection sensor 162 detects whether or not there is a person in the detection region 300.

The system controller 151 controls the operation sequence of the image forming apparatus 100 in the above-described manner.

Motor Control Apparatus

Next, the motor control apparatus 157 is described. Since the motor control apparatus 158 is similar in configuration to the motor control apparatus 157, the description thereof is omitted. The brushless DC motor 402 (hereinafter referred to as the motor 402) and the brushless DC motor 403 (hereinafter referred to as the motor 403) described below do not include a sensor such as a Hall element for detecting the rotation phase of the rotor of the motor.

Figure 4:
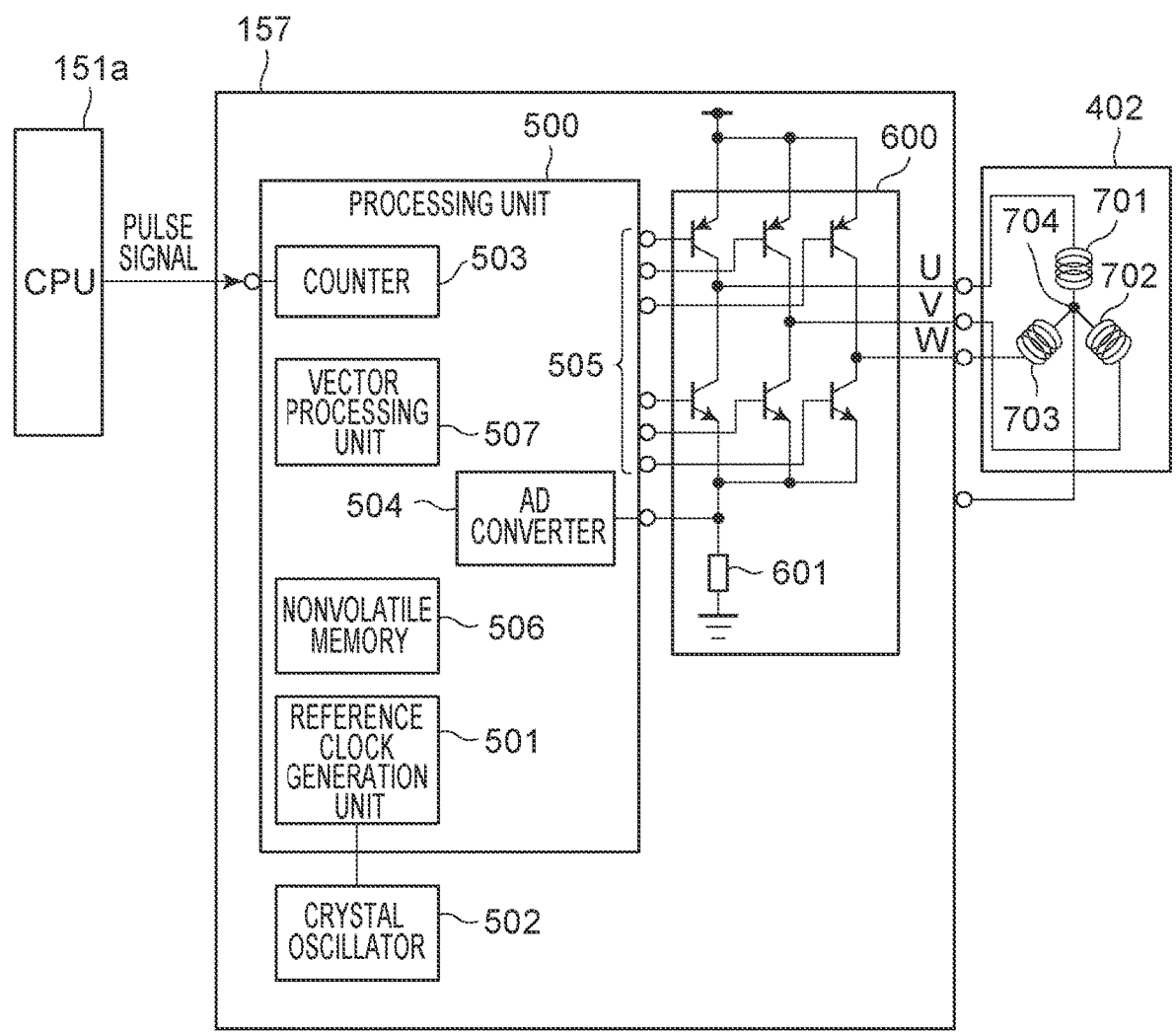
FIG. 4 is a block diagram showing a configuration of a motor control apparatus.

FIG. 4 is a block diagram showing an example of a configuration of the motor control apparatus 157. The motor control apparatus 157 is composed of at least one application-specific integrated circuit (ASIC) so as to be capable of executing functions described below.

The motor control apparatus 157 includes a processing unit 500. The processing unit 500 includes a reference clock generation unit 501, a counter 503, an AD converter 504, a nonvolatile memory 506, and a vector control unit 507.

The reference clock generation unit 501 generates a reference clock based on a signal supplied from a crystal oscillator 502. The counter 503 counts the pulse signal output from the CPU 151a, and determines the period of the pulse signal based on the count value and the reference clock.

A pulse width modulation (PWM) port 505 outputs PWM signals for driving respective switching elements of the three-phase inverter 600. Each of the switching elements of the 3-phase inverter 600 may be, for example, a FET. The FETs are driven by the PWM signals so as to supply currents to a plurality of windings 701 (U phase), 702 (V phase), and 703 (W phase) of the motor 402.

The current supplied to each of the windings 701, 702, and 703 is detected by a resistor 601 and the AD converter 504. More specifically, the voltage across the resistor 601 is converted from an analog value to a digital value by the AD converter 504, and the current supplied to each of the windings 701, 702, and 703 is detected from the resultant digital value.

In the present embodiment, the current flowing through the winding of each phase is detected by the resistor 601 provided at the node at which the U-phase, V-phase, and W-phase wirings are connected. However, this configuration is merely an example, and the current may be detected in other ways. For example, the current flowing through the W-phase winding may be calculated based on currents detected by resistors provided in the U-phase wiring and V-phase wiring, or the current flowing through the winding of each phase may be detected by a resistor provided in each of the U phase, V phase, and W phase. That is, the current flowing through each phase may be detected by any known technique.

Structure of Motor

Figure 5:
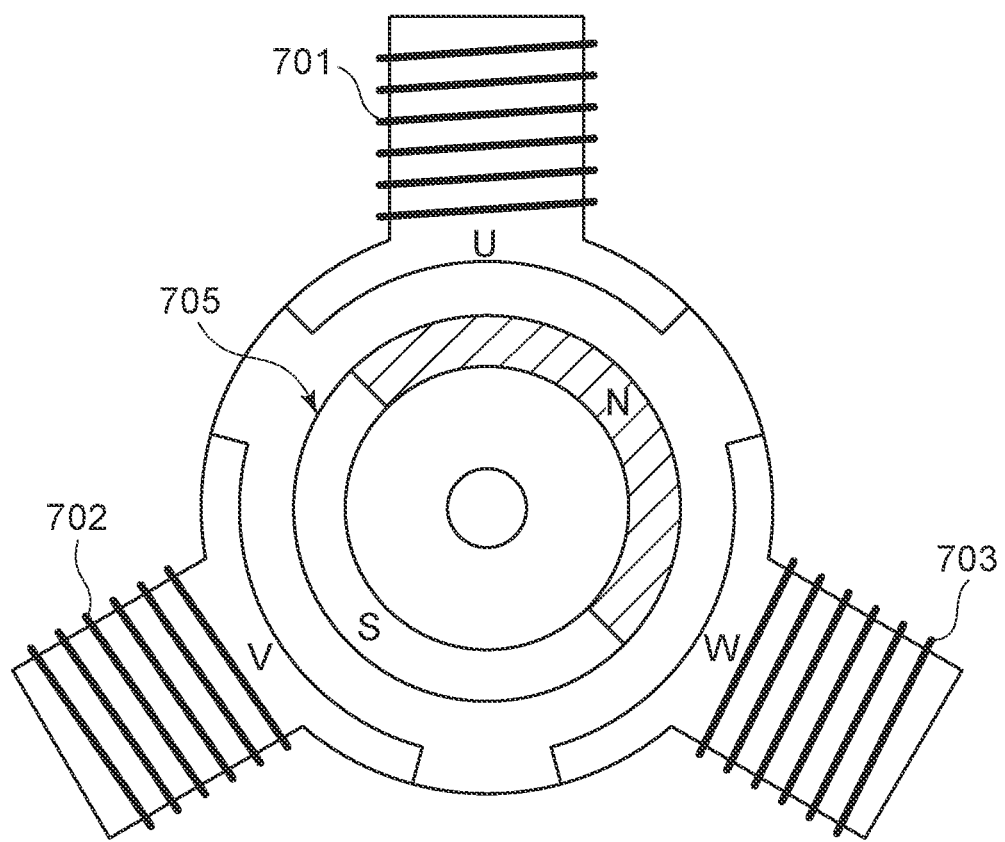
FIG. 5 is a diagram showing a structure of a motor.

FIG. 5 is a diagram illustrating a structure of the motor 402 (the motor 403). In the present embodiment, the motor 402 includes three-phase (U, V, W) windings 701, 702, and 703 wound around the stator.

A rotor 705 is composed of a permanent magnet having an N pole and an S pole. The stop position (the rotation phase at the stop position) of the rotor 705 is determined by a combination of the excited windings 701, 702, and 703, that is, by the excitation phase. In the following description, for example, exciting the X-Y phase refers to exciting performed such that the X phase provides an N pole and the Y phase provides an S pole.

Detection of Stop Position

Next, the detection of the phase (the stop position) of the rotor 705 when the rotor 705 is at a stop position is described. In the present embodiment, the stop position of the rotor 705 is detected based on the fact that the inductance of each winding 701, 702, and 703 changes according to the stop position of the rotor 705.

In general, each winding is composed of a copper wire wound around a core composed of laminated magnetic steel sheets. The magnetic permeability of the magnetic steel sheet becomes small when there is an external magnetic field. That is, the existence of an external magnetic field causes a reduction in the inductance of the winding, since the inductance is proportional to the magnetic permeability of the core.

For example, as shown in FIG. 5, when the rotor 705 stops such that the center of the S pole region of the rotor 705 is located at the position opposite to the V-phase winding 702, large influence of the external magnetic field by the rotor 705 is exerted, and thus a large relative reduction occurs in the inductance of the winding 702.

The inductance reduction ratio also changes depending on the direction of the current flowing through the V-phase winding 702.

More specifically, in a case where the direction of the magnetic field generated by the current flowing through the winding 702 is the same as the direction of the external magnetic field from the rotor 705, the inductance reduction ratio is larger than in a case where the direction of the magnetic field generated by the current flowing through the winding 702 is opposite to the direction of the external magnetic field from the rotor 705. That is, in the case shown in FIG. 5, the inductance reduction ratio is larger when the V phase (the winding 702) is excited so as to have the N pole than when the V phase (the winding 702) is excited so as to have the S pole.

In the state shown in FIG. 5, both the S pole and the N pole of the rotor 705 face the W phase (the winding 703). Therefore, the influence of the external magnetic field by the rotor 705 is small, and the inductance reduction ratio for the winding 703 is small.

As described above, the inductances of the windings 701, 702, and 703 have different values depending on the stop position of the rotor 705.

Figure 6A:
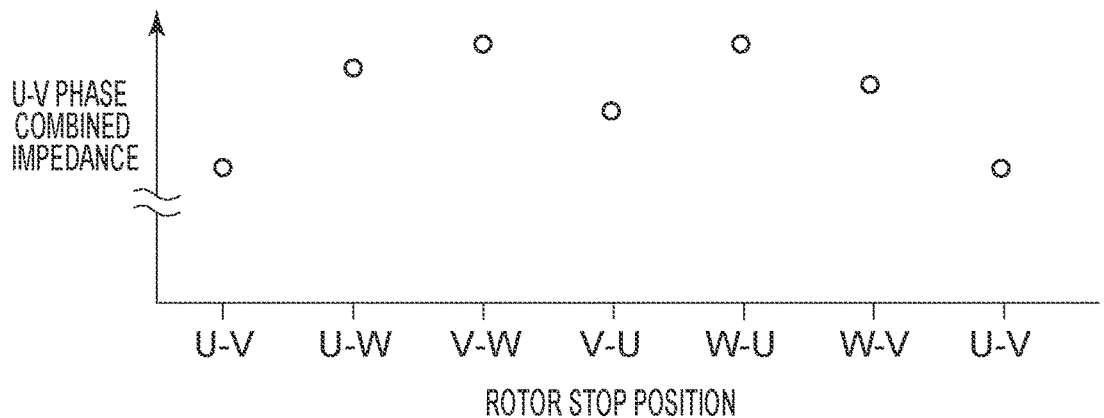
FIGS. 6A, 6B, and 6C are diagrams showing a relationship between a rotor stop position and an excitation phase.

FIG. 6A shows a relationship between the stop position of the rotor 705 and the combined inductance of the U-V phase, which is one of the excitation phases. In the following description, the stop position of the rotor 705 will be indicated by the corresponding excitation phase. The combined inductance of the U-V phase is defined by the combined inductance of the winding 701 and the winding 702 obtained when currents flow such that the U phase has the N pole and the V phase has the S pole.

In the present embodiment, the inductance is detected by detecting a physical quantity that changes according to the change in the inductance. For example, since the rising speed of the current (the voltage) flowing through the winding differs depending on the value of the inductance, the rising speed may be measured to detect the inductance.

Figure 6B:
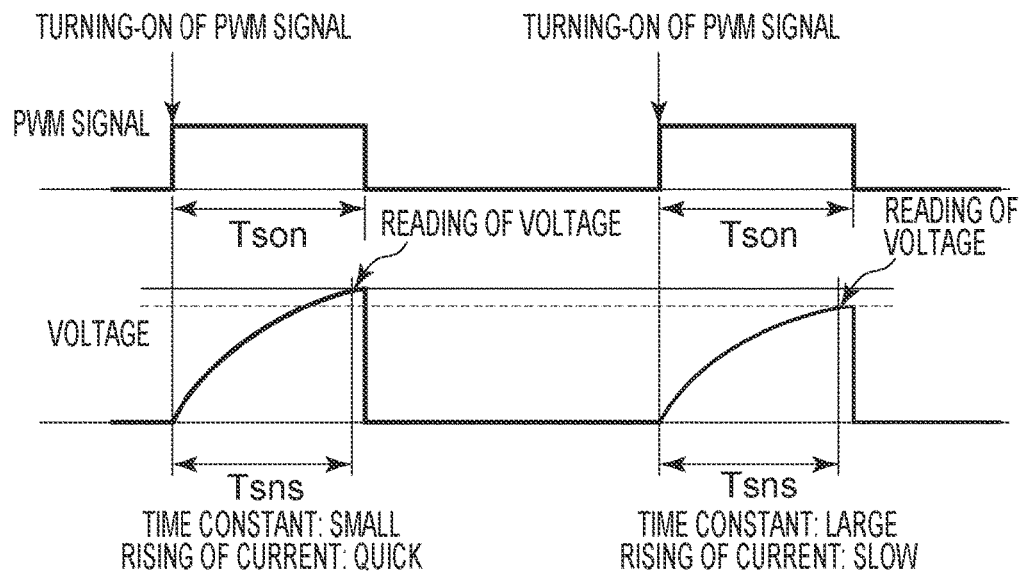

More specifically, as shown in FIG. 6B, the processing unit 500 turns on the PWM signal and maintains its ON state during a predetermined period of time Tson. When a predetermined time (Tsns) has elapsed since the time when the PWM signal is turned on, the processing unit 500 detects, using the AD converter 504, the voltage that appears across the resistor 601 thereby measuring the rising speed of the voltage appearing across the resistor 601. Note that the predetermined period Tson is a period during which the rotor 705 does not have a movement caused by the generated torque. The relationship among the stop position of the rotor 705, the excitation phase through which the current flows, and the voltage generated across the resistor 601 is stored in the nonvolatile memory 507 in advance.

Figure 6C:
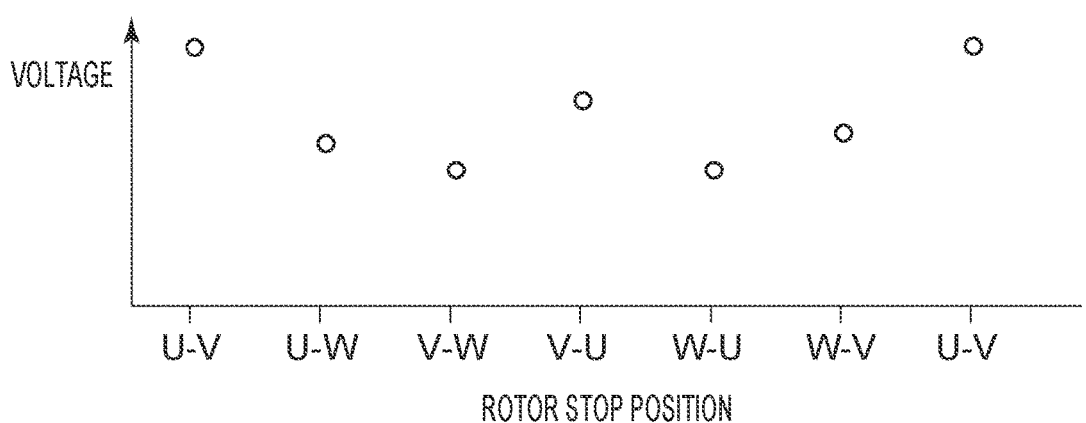

FIG. 6C shows the relationship between the stop position of the rotor 705 and the voltage generated across the resistor 601 when a current is passed through the U-V phase. As shown in FIG. 6C, the voltage generated across the resistor 601 when the current flows in the U-V phase has a maximum value when the stop position of the rotor 705 is in the U-V phase position. Since the voltage generated across the resistor 601 differs depending on the stop position of the rotor 705 as described above, the processing unit 500 can determine the stop position of the rotor 705 based on the voltage across the resistor 601. More specifically, for example, the voltage across the resistor 601 (that is, the current flowing through the winding) that occurs when a predetermined time has elapsed since a current was passed through one or more excitation phases is measured, and the stop position of the rotor 705 is determined based on information stored in the nonvolatile memory 507.

Note that the above-described method of detecting the stop position is merely an example according to the present embodiment, and the method is not limited to this example. That is, it is allowed to employ a known technique for detecting the stop position based on currents flowing through the windings without using a Hall element or a rotary encoder for detecting the stop position of the rotor in the stopped state.

Control of Motor

Synchronization Control

After the stop position of the rotor 705 is detected, the motor control apparatus 157 determines the excitation phase for fixing the rotor 705 to this stop position, and controls the three-phase inverter 600 such that currents flow to achieve the determined excitation phase.

The CPU 151a outputs pulse signals to the motor control apparatus 157 according to the operation sequence of the motor 402. The number of pulse signals corresponds to the target phase of the rotor 705, and the frequency of the pulse signal corresponds to the target speed of the rotor 705.

The motor control apparatus 157 switches the excitation phase each time a pulse signal is input from the CPU 151a. For example, when the motor control apparatus 157 receives a pulse signal after exciting the U-V phase, the motor control apparatus 157 controls the three-phase inverter 600 so as to excite the U-W phase. When a pulse signal is further input to the motor control apparatus 157, the motor control apparatus 157 controls the three-phase inverter 600 so as to excite the V-W phase. In the present embodiment, as described above, the motor control apparatus 157 performs a synchronization control to drive the motor 402 according to a pulse signal which is output from the CPU 151a after the stop position of the rotor 705 is detected. In the synchronization control, the drive currents flowing through the windings 701, 702, and 703 are controlled such that currents of predetermined magnitudes flow through the windings 701, 702, and 703. More specifically, to prevent the motor from stepping out even when the load torque applied to the rotor changes, magnitudes of drive currents supplied to the windings are determined such that the magnitudes correspond to the torque estimated to be necessary for the rotor to rotate plus an additional particular margin. This is because in the case where a motor is controlled by the synchronization control scheme, the magnitudes of the drive currents are not controlled based on the determined (estimated) rotation phase or rotation speed (that is, feedback control is not performed), and therefore, the drive currents are not adjusted according to the load torque applied to the rotor. Note that the larger the current, the larger the torque applied to the rotor. The amplitude corresponds to the magnitude of the current vector.

Vector Control

In the present embodiment, when the motor control apparatus 157 is executing the synchronization control, if the frequency of the pulse output from the CPU 151a (that is, the value corresponding to the target speed of the rotor 705) becomes equal to or larger than a predetermined value, the motor control apparatus 157 executes the vector control by using the vector control unit 507. When the motor control apparatus 157 is executing the synchronization control, if the frequency of the pulse output from the CPU 151a becomes smaller than a predetermined value, the motor control apparatus 157 executes the synchronization control.

Figure 7:
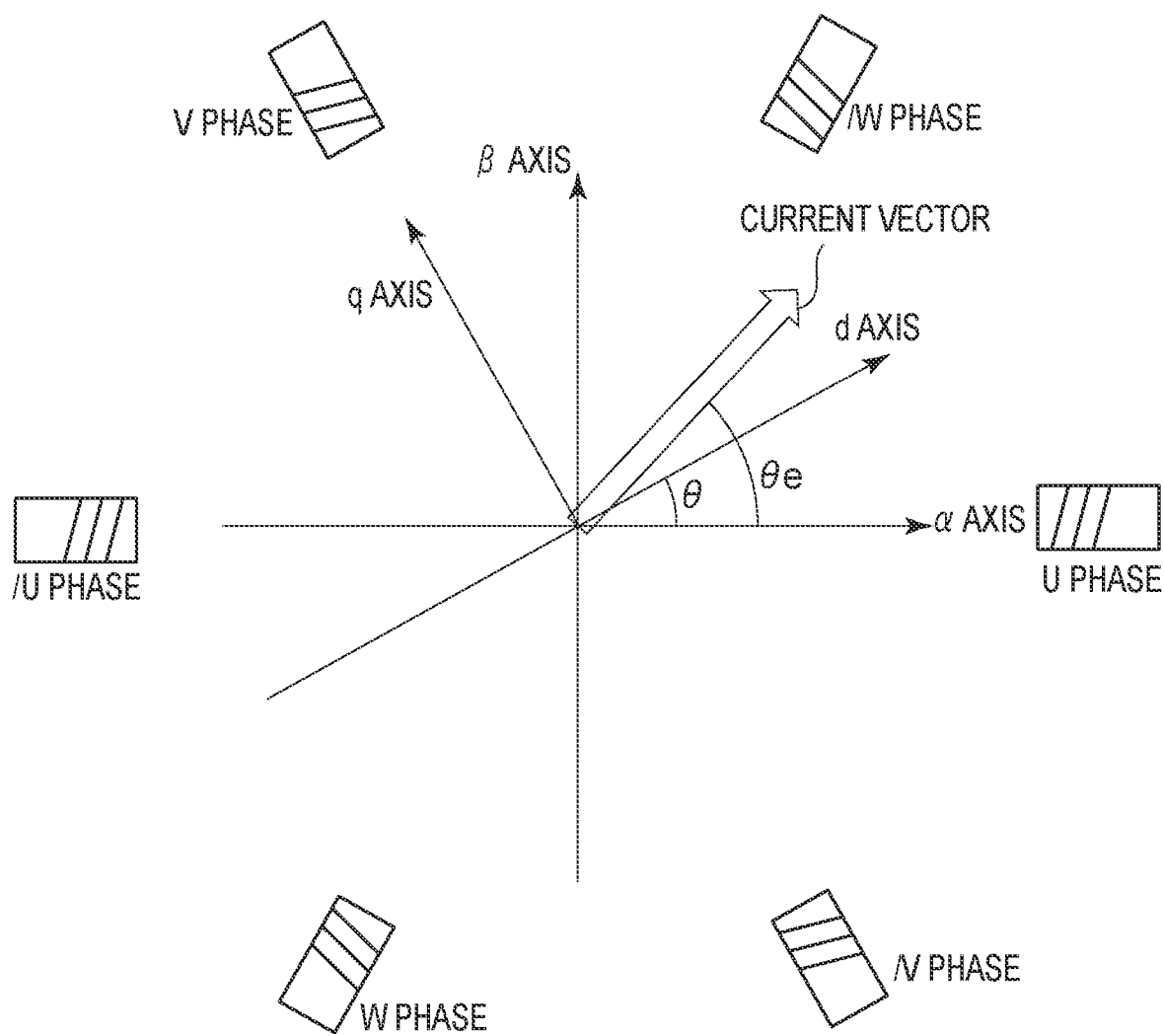
FIG. 7 is a diagram showing a relationship of a U phase, a V phase, and a W phase with a rotating coordinate system represented by a d-axis and a q-axis.

FIG. 7 is a diagram showing a relationship between the U phase, the V phase, and the W phase and a rotating coordinate system represented by a d axis and a q axis. In FIG. 7, in the coordinate system at rest, an α axis corresponding to the U-phase winding and a β axis perpendicular to the α axis are defined. Furthermore, in FIG. 7, the d axis is defined by the direction of the magnetic flux created by the magnetic poles of the permanent magnet used in the rotor 705, and the q axis is defined by the direction which is 90 degrees counterclockwise from the d axis (which is perpendicular to the d axis).

The angle formed by the α axis and the d axis is defined as θ, and the rotation phase of the rotor 705 is represented by the angle θ. In the vector control, a rotating coordinate system is used where the rotation phase θ is used as a reference. More specifically, the vector control is performed using current components, that is, the q-axis component (the torque current component) and the d-axis component (the excitation current component) which are represented in the rotating coordinate system for the current vector corresponding to the driving currents flowing through the windings wherein the q-axis component generates the torque applied to the rotor and the d-axis component affects the strength of the magnetic flux penetrating the winding. In FIG. 7, the direction in which the rotor 705 rotates counterclockwise is defined as a positive direction.

The vector control is a control method for controlling a motor by performing speed feedback control for controlling the value of the torque current component and the value of the excitation current component so as to reduce a deviation between a command speed indicating a target speed of the rotor and an actual rotational speed. In an alternative method, the motor may be controlled by performing phase feedback control for controlling the value of the torque current component and the value of the excitation current component so as to reduce the deviation between a command phase indicating a target phase of the rotor and an actual rotation phase.

Figure 8:
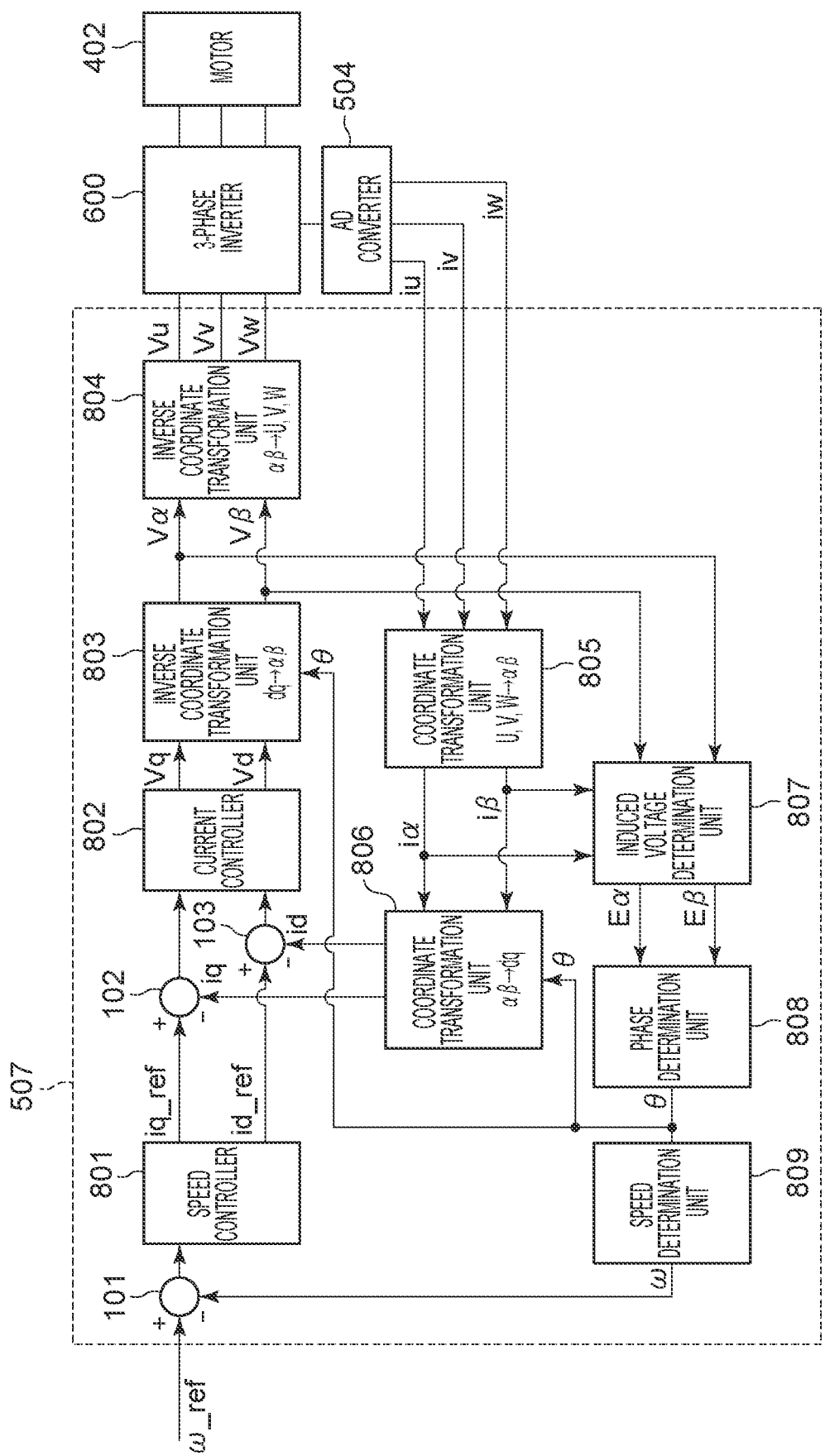
FIG. 8 is a block diagram showing a configuration of a vector control unit.

FIG. 8 is a block diagram showing an example of the configuration of the vector control unit 507. The vector control unit 507 is composed of at least one ASIC and executes functions described below.

The vector control unit 507 includes, as one or more circuits for performing the vector control, a speed controller 801, a current controller 802, inverse coordinate transformation units 803 and 804, coordinate transformation units 805 and 806, etc. The coordinate transformation unit 805 transforms the current vector corresponding to the drive currents flowing through the U-phase, V-phase and W-phase windings of the motor 402 into coordinates in the coordinate system at rest represented by the α axis and the β axis by the Clark transformation. The current values represented in the α-β coordinate system at rest obtained by the coordinate transformation by the coordinate transformation unit 804 are transformed by the coordinate transformation unit 806 into the rotating coordinate system represented by the q-axis and the d-axis. That is, the drive currents flowing through the windings are each represented by the current value of the q-axis component (the q-axis current) and the current value of the d-axis component (the d-axis current), which are the current values in the rotating coordinate system. The q-axis current corresponds to a torque current that generates a torque applied to the rotor 705 of the motor 402. The d-axis current corresponds to an exciting current that affects the strength of a magnetic flux penetrating a winding of the motor 402. The vector control unit 507 is capable of independently controlling the q-axis current and the d-axis current. Therefore, the vector control unit 507 can efficiently generate the torque required for the rotor 705 to rotate by controlling the q-axis current according to the load torque applied to the rotor 705. That is, in the vector control, the magnitude of the current vector shown in FIG. 7 changes according to the load torque applied to the rotor 705.

The vector control unit 507 determines the rotation phase θ and the rotation speed ω of the rotor 705 of the motor 402 by a method described later, and performs the vector control based on the determined rotation phase θ and the rotation speed ω.

As described above, the counter 503 calculates the frequency of the pulse signal output from the CPU 151a. A value corresponding to the frequency of the pulse signal calculated by the counter 503, that is, a command speed ω_ref indicating the target speed of the rotor 705, is input to the vector control unit 507.

A subtractor 101 calculates a deviation Δω between the rotation speed co of the rotor 705 of the motor 402 and the command speed ω_ref.

The speed controller 801 acquires the deviation Δω at intervals corresponding to a period T (for example, 200 μs). The speed controller 801 generates a q-axis current command value iq_ref and a d-axis current command value id_ref based on proportional control (P control), integral control (I control), and differential control (D control) such that the deviation output from the subtractor 101 is reduced, and outputs the resultant q-axis current command value iq_ref and d-axis current command value id_ref. More specifically, the speed controller 801 generates the q-axis current command value iq_ref and the d-axis current command value id_ref based on P control, I control, and D control such that the deviation output from the subtractor 101 becomes equal to 0, and outputs the resultant q-axis current command value iq_ref and d-axis current command value id_ref. Note that the P control is a control method in which a value of a variable to be controlled is controlled based on a value proportional to a deviation between a command value and an estimated value. The I control is a control method in which a value of a variable to be controlled is controlled based on a value proportional to a time integral of a deviation between a command value and an estimated value. The D control is a control method in which a value of a variable to be controlled is controlled based on a value proportional to a time change of a deviation between a command value and an estimated value. In the present embodiment, the speed controller 801 generates the q-axis current command value iq_ref and the d-axis current command value id_ref based on the proportional-integral-derivative (PID) control, but the control method is not limited to this. For example, the speed controller 801 may generate the q-axis current command value iq_ref and the d-axis current command value id_ref based on PI control. In a case where a permanent magnet is used for the rotor, the d-axis current command value id_ref, which normally affects the strength of the magnetic flux penetrating the winding, is set to 0, but the d-axis current command value id_ref is not limited to 0.

The drive currents flowing through the U-phase, V-phase, and W-phase windings of the motor 402 are converted from analog values to digital values by the AD converter 504. The AD converter 504 samples the current at a sampling interval (for example, 25 μs) equal to or smaller than the interval T at which the speed controller 801 acquires the deviation Δω.

The values iu, iv, and iw of the drive currents converted from the analog values to the digital values by the AD converter 504 are input to the coordinate transformation unit 805.

The coordinate transformation unit 805 transforms the input current values iu, iv, and iw into current values iα and iβ in the coordinate system at rest according to the following equations.

$$i\alpha = iu - \frac{1}{2}iv - \frac{1}{2}iw \quad (1)$$

$$i\beta = \frac{\sqrt{3}}{2}iv - \frac{\sqrt{3}}{2}iw \quad (2)$$

$$iu + iv + iw = 0 \quad (3)$$

The current values iα and iβ in the coordinate system at rest can be represented by the magnitude I of the current vector corresponding to the drive currents flowing through the U-phase, V-phase, and W-phase windings and the phase θe of the current vector as shown in the following equations, where the phase θe of the current vector is defined by the angle formed by the α axis and the current vector.

$$i\alpha = I^* \cos(\theta e) \quad (4)$$

$$i\beta = I^* \sin(\theta e) \quad (5)$$

These current values iα and iβ are input to the coordinate transformation unit 806 and the induced voltage determination unit 807.

The coordinate transformation unit 806 transforms the current values iα and iβ in the coordinate system at rest into a q-axis current value iq and a d-axis current value id in the rotating coordinate system according to the following equations.

$$id = i\alpha^* \cos\theta + i\beta^* \cos\theta \quad (6)$$

$$iq = -i\alpha^* \sin\theta + i\beta^* \cos\theta \quad (7)$$

The q-axis current command value iq_ref output from the speed controller 801 and the current value iq output from the coordinate transformation unit 806 are input to the subtractor 102. The subtractor 102 calculates the deviation between the current value iq and the q-axis current command value iq_ref, and outputs the calculated deviation to the current controller 802.

The d-axis current command value id_ref output from the speed controller 801 and the current value id output from the coordinate transformation unit 806 are input to the subtractor 103. The subtractor 103 calculates the deviation between the current value id and the d-axis current command value id_ref, and outputs the calculated deviation to the current controller 802.

The current controller 802 generates a drive voltage Vq based on the PID control such that the deviation output from the subtractor 102 is small More specifically, the current controller 802 generates the drive voltage Vq such that the deviation output from the subtractor 102 is equal to 0, and outputs the resultant drive voltage Vq to the inverse coordinate transformation unit 505.

Furthermore, the current controller 802 generates a drive voltage Vd based on the PID control such that the deviation output from the subtractor 103 is small. More specifically, the current controller 802 generates the drive voltage Vd such that the deviation output from the subtractor 103 is equal to 0, and outputs the resultant drive voltage Vd to the inverse coordinate transformation unit 803.

Although the current controller 802 according to the present embodiment generates the drive voltages Vq and Vd based on the PID control, drive voltages Vq and Vd may be generated in other ways. For example, the current controller 802 may generate the drive voltages Vq and Vd based on the PI control.

The inverse coordinate transformation unit 803 inversely transforms the drive voltages Vq and Vd in the rotating coordinate system output from the current controller 802 into the drive voltages Vα and Vβ in the coordinate system at rest according to the following equations.

$$V\alpha = Vd^* \cos\theta - Vq^* \sin\theta \quad (8)$$

$$V\beta = Vd^* \sin\theta + Vq^* \cos\theta \quad (9)$$

The inverse coordinate transformation unit 803 outputs the inversely transformed drive voltages Vα and Vβ to the induced voltage determination unit 512 and the inverse coordinate transformation unit 804.

The inverse coordinate transformation unit 804 transforms the input drive voltages Vα and Vβ into a U-phase drive voltage Vu, a V-phase drive voltage Vv, and a W-phase drive voltage Vw according to the following equations.

$$Vu = \frac{2}{3}i\alpha \quad (10)$$

$$Vv = -\frac{1}{3}i\alpha + \frac{1}{\sqrt{3}}i\beta \quad (11)$$

$$Vw = -\frac{1}{3}i\alpha - \frac{1}{\sqrt{3}}i\beta \quad (12)$$

The inverse coordinate transformation unit 804 outputs the resultant transformed drive voltages Vu, Vv, and Vw to the three-phase inverter 600.

The three-phase inverter 600 is driven by a PWM signal based on the drive voltages Vu, Vv, and Vw input from the inverse coordinate transformation unit 804. As a result, the three-phase inverter 600 generates drive currents iu, iv, and iw corresponding to the drive voltages Vu, Vv, and Vw, and supplies the resultant drive currents iu, iv, and iw to the windings of the respective phases of the motor 402 thereby driving the motor 402.

Next, a process and related units for determining the rotation phase θ are described. The rotation phase θ of the rotor 705 is determined based on values Eα and Eβ corresponding to the induced voltages which are induced in the U-phase, V-phase, and W-phase windings of the motor 402 by the rotation of the rotor 705. Eα and Eβ are respectively values of the induced voltages corresponding to the α axis and the β axis. The values of the induced voltages are determined (calculated) by the induced voltage determination unit 807. More specifically, the induced voltages Eα and Eβ are determined from the current values iα and iβ output from the coordinate transformation unit 805 and the drive voltages Vα and Vβ output from the inverse coordinate transformation unit 803 according to the following equations.

$$E\alpha = V\alpha - R*i\alpha - L*\frac{di\alpha}{dt} \quad (13)$$

$$E\alpha = V\beta - R*i\beta - L*\frac{di\beta}{dt} \quad (14)$$

In the above equations, R is winding resistance and L is winding inductance. The values of the winding resistance R and the winding inductance L are peculiar to the motor 402 used, and the values are stored in advance in the ROM 151*b* or a memory (not shown) or the like provided in the motor control apparatus 157.

The induced voltages Eα and Eβ determined by the induced voltage determination unit 807 are output to the phase determination unit 808.

The phase determination unit 808 determines the rotation phase θ of the rotor 705 of the motor 402 based on the ratio of the induced voltage Eα and the induced voltage Eβ output from the induced voltage determination unit 807 according to the following equation.

$$\theta = \tan^{-1}\left(\frac{E\beta}{E\alpha}\right) \quad (15)$$

In the present embodiment, the phase determination unit 808 determines the rotation phase θ by performing an operation based on the equation (15), but the determination method is not limited to this. For example, the phase determination unit 808 may determine the rotation phase θ by referring to a table indicating a relationship of the induced voltage Eα} and the induced voltage Eβ with the rotation phase corresponding to the induced voltage Eα and the induced voltage Eβ.

The rotation phase θ obtained as described above is input to the speed determination unit 809, the inverse coordinate transformation unit 803, and the coordinate transformation unit 805.

The speed determination unit 809 determines the rotation speed ω based on the time change of the rotation phase θ output from the phase determination unit 808. The following equation (16) is used to determine the speed.

$$\omega = \frac{d\theta}{dt} \quad (16)$$

The rotation phase w obtained as described above is input to the subtractor 101.

In the vector control, the vector control unit 507 repeatedly performs the control described above.

As described above, the vector control unit 507 according to the present embodiment performs the vector control using the speed feedback control so as to control the current values in the rotating coordinate system such that the deviation between the rotation speed ω and the command speed ω_ref is small. By performing the vector control, it is possible to suppress the motor from stepping out and it is possible to suppress the increase in motor noise due to excess torque and the increase in power consumption.

In the present embodiment, the rotation phase θ and the rotation speed ω are determined based on the equations (13) to (16), but this is by way of example only. That is, the rotation phase θ and the rotation speed ω may be determined by a known method.

Motor Drive Sequence

Next, the drive sequence of the motor 402 according to the present embodiment is described. In the present embodiment, the FPOT in the image forming apparatus is shortened by the following technique. In the following description, by way of example, the motor 402 drives the pickup roller 19.

Figure 9:
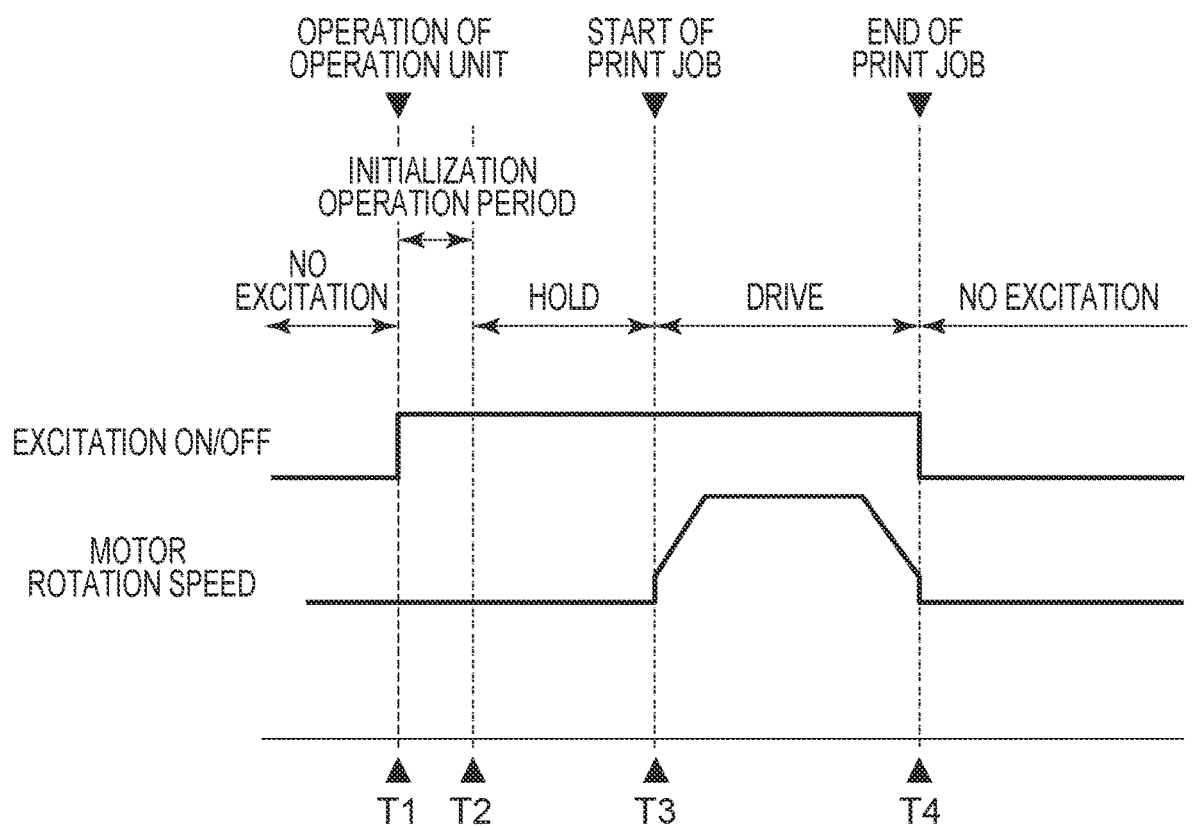
FIG. 9 is a diagram illustrating a motor drive sequence according to a first embodiment.

FIG. 9 is a diagram illustrating a motor drive sequence. In the present embodiment, during a period in which the operation unit 152 is being operated, setting data and the like set in the operation unit 152 are transmitted from the operation unit 152 to the CPU 151*a* functioning as the receiving unit at predetermined time intervals. When the motor control apparatus 157 is notified by the operation unit 152 that the operation unit 152 is being operated in a state where the windings of the motor 402 are not excited (not driven) (at time T1), the motor control apparatus 157 starts the operation of detecting the stop position of the rotor of the motor 402 (the initial operation).

When the detection of the stop position of the rotor of the motor 402 is completed (at time T2), the motor control apparatus 157 controls the currents based on the detected stop position so as to hold the rotor of the motor 402 in a specific phase.

After that, when an instruction to start a print job is input from the operation unit 152 or an external device during a period from the time T2 to the lapse of a predetermined time Tth (to time T3), the motor control apparatus 157 drives the motor 402 by synchronization control and then by the vector control. Then, the motor 402 is driven at a predetermined rotation speed. In a case where an instruction to start a print job is not input in the period from the time T2 until the predetermined time Tth elapses, the motor control apparatus 157 turns off the excitation.

After that, when the driving of the motor 402 based on the image formation sequence is completed, the motor control apparatus 157 decelerates the motor 402 and turns off the excitation of the windings of the motor 402 (at time T4).

Figure 10:
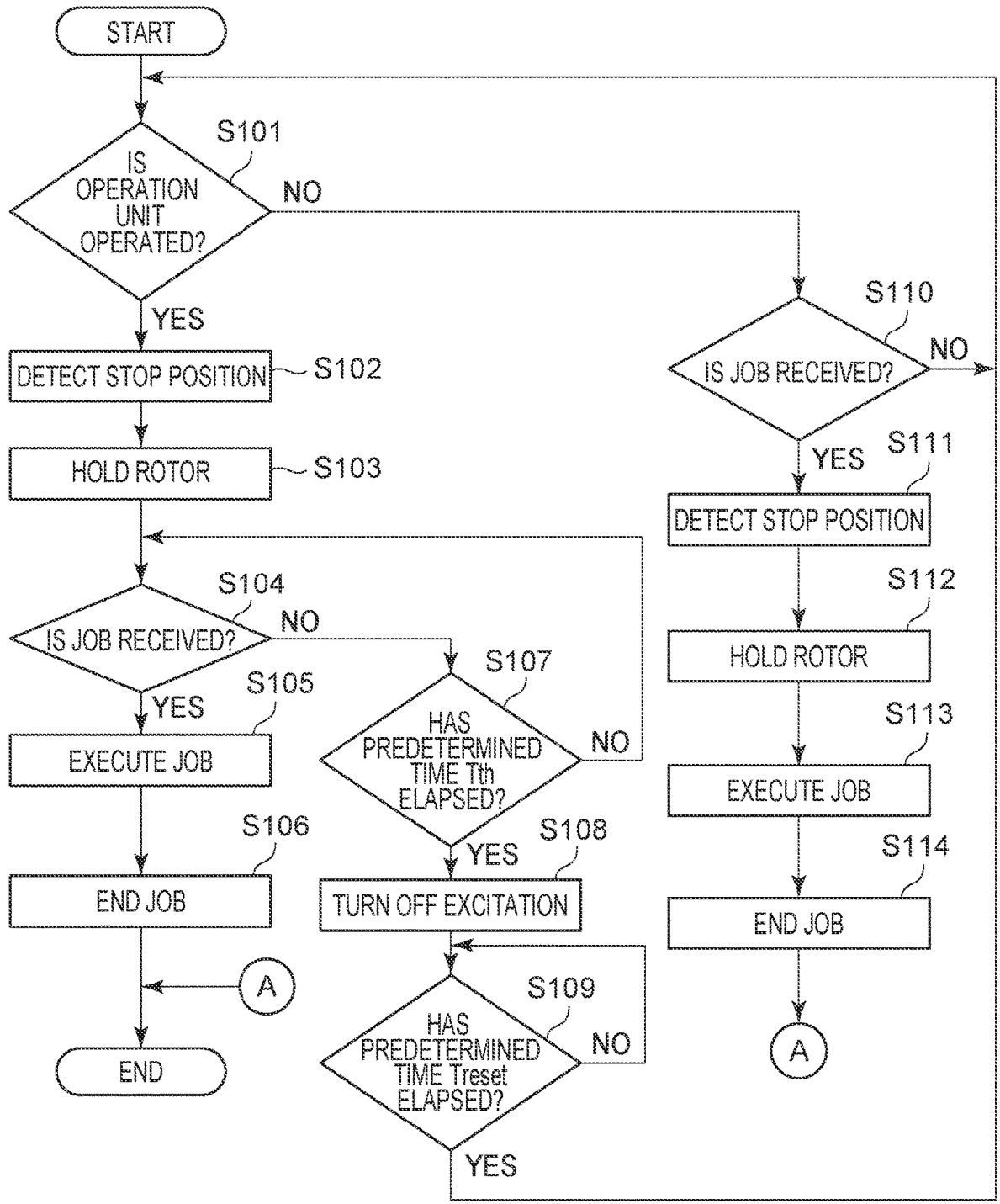
FIG. 10 is a flowchart illustrating a motor drive sequence.

FIG. 10 is a flowchart illustrating a motor drive sequence. The drive sequence of the motor 402 according to the present embodiment is described below with reference to FIG. 10. The process shown in FIG. 10 is performed in a state where the excitation of the windings of the motor 402 is in the OFF state. Note that the process shown in FIG. 10 is executed by the CPU 151*a*.

When the CPU 151a is notified in S101 that the operation unit 152 is operated, the CPU 151a causes, in S102, the motor control apparatus 157 to execute the operation of detecting the stop position of the motor 402.

Then, in S103, the CPU 151a controls the motor control apparatus 157 so as to hold the rotor of the motor 402 in a specific phase.

When an instruction to start a print job is input in S104, the CPU 151a controls the image forming apparatus 100 to execute an image forming operation in S105.

When the print job is completed in S106, the CPU 151a ends the process of the present flowchart.

In a case where an instruction to start a print job is not input in S104, the process proceeds to S107.

When it is determined in S107 that the predetermined timer Tth has not yet elapsed since the holding of the rotor of the motor 402, the CPU 151a returns the process to S104.

In a case where it is determined in S107 that the predetermined timer Tth has elapsed since the holding of the rotor of the motor 402, in S108, the CPU 151a controls the motor control apparatus 157 to release the holding of the rotor (by turning off the excitation). As described above, in a case where no print job is input in a period of the predetermined time Tth after the rotor of the motor 402 is held, the excitation is turned off thereby preventing the increase in power consumption.

Next, when it is determined in S109 that a particular time Treset has elapsed since the processing in S108, the processing returns to S101. The processing returns to S101 when the particular time Treset has elapsed since the processing in S108, and thus when a user operates the operation unit 152 again, the operation of detecting the stop position of the rotor of the motor 402 is started before the print job is started.

On the other hand, in a case where the CPU 151a does not receive in S101 a notification notifying that the operation unit 152 is operated, the processing proceeds to S110.

In a case where an instruction to start a print job is not input in S110, the processing returns to S101.

When an instruction to start a print job is input in S110, the CPU 151a causes the motor control apparatus 157 to execute the operation of detecting the stop position of the motor 402 in S111.

Then, in S112, the CPU 151a controls the motor control apparatus 157 so as to hold the rotor of the motor 402 in a specific phase.

Then, in S113, the CPU 151a executes an image forming operation using the image forming apparatus 100.

When the print job is completed in S114, the CPU 151a ends the processing of the present flowchart.

As described above, in the present embodiment, when the motor control apparatus 157 is notified by the operation unit 152 that the operation unit 152 is operated in the state where the windings of the motor 402 are not excited, the motor control apparatus 157 starts the operation of detecting the stop position of the rotor of the motor 402. That is, when there is a possibility that an instruction to start a print job is issued, the motor control apparatus 157 starts the operation of detecting the stop position of the rotor of the motor 402 before the instruction to start the print job is issued. In the present embodiment, as described above, before an instruction to start a print job is issued, the operation is performed to detect the stop position of the rotor of the motor 402 that drives the pickup roller 19 which is a most upstream one of transport rollers for transporting a recording medium in the print job. This allows a reduction in the FPOT as compared with a case where the operation of detecting the stop position of the rotor of the motor 402 is started after the instruction to start the print job is issued. That is, according to the present embodiment, it is possible to provide an image forming apparatus capable of shortening the FPOT.

In the present embodiment, the operation of detecting the stop position of the rotor of the motor 402 is started depending on whether or not the operation unit 152 is operated, but this is merely an example. For example, the motor control apparatus 157 starts the operation of detecting the stop position of the rotor of the motor 402 when the human body detection sensor 162 detects a person as an object in a state where the windings of the motor 402 are not excited. That is, when there is a possibility that an instruction to start a print job is issued, the motor control apparatus 157 starts the operation of detecting the stop position of the rotor of the motor 402 before the instruction to start the print job is issued. That is, before an instruction to start a print job is issued, the operation is performed to detect the stop position of the rotor of the motor 402 that drives the pickup roller 19 which is a most upstream one of transport rollers for transporting a recording medium in the print job. This allows a reduction in the FPOT as compared with a case where the operation of detecting the stop position of the rotor of the motor 402 is started after the instruction to start the print job is issued. That is, according to the present embodiment, it is possible to provide an image forming apparatus capable of shortening the FPOT.

In the present embodiment, when the motor control apparatus 157 is notified by the operation unit 152 that the operation unit 152 is being operated in the state where the windings of the motor 402 are not excited, the motor control apparatus 157 starts the operation of detecting the stop position of the rotor of the motor 402, but this is merely an example. For example, the motor control apparatus 157 may start the operation of detecting the stop position of the rotor of the motor 402 when a sensor (not shown) disposed on the document stacking part 2 detects a document placed on the document stacking part 2 in a state where the windings of the motor 402 are not excited. Alternatively, the motor control apparatus 157 may start the operation of detecting the stop position of the rotor of the motor 402 when a sensor (not shown) disposed on the manual feed tray 44 detects a document placed on the manual feed tray 44 in a state where the windings of the motor 402 are not excited.

The present embodiment has been described above for the case where the motor 402 drives the pickup roller 19, but this is merely an example. For example, the present embodiment may be applied to a case where the motor 402 drives a pickup roller other than the pickup roller 19.

Although in the present embodiment, the motor 402 drives the pickup roller 19, the motor 402 may drive the pickup roller 19 and the transport roller 39. That is, the motor 402 may be configured to drive a plurality of transport rollers including the pickup roller 19.

Although in the present embodiment, the motor 402 drives the pickup roller 19, the motor 402 may drive, for example, the pickup roller 43.

Second Embodiment

A second embodiment of an image formation apparatus 100 is described below. In the following description, parts of the image forming apparatus 100 similar to those of the image forming apparatus according to the first embodiment are not described.

In the second embodiment, after an instruction to start a print job is input from the operation unit 152 or from an external device, the motor control apparatus 158 that controls the motor 403 that drives the discharge roller 30 starts the operation of detecting the stop position of a rotor of the motor 403. This is because even when the operation of detecting the stop position of the rotor of the motor 403 is started after the instruction to start the print job is issued, it is possible to accelerate the moto 403 such that the rotation speed of the motor 403 reaches a predetermined value before a recording medium arrives at the discharge roller 30, and thus no increase in the FPOT occurs. This configuration makes it possible to reduce the power consumption as compared with the case where the operation of detecting the stop positions of the rotors of all motors in the image forming apparatus is performed before the instruction to start the print job is issued. Note that in the present embodiment, the time required to execute the operation of detecting the stop position of the rotor of the motor 403 and accelerate the motor 403 to a specific rotation speed is shorter than the time needed for a recording medium to reach the discharge roller 30 after a print job is started.

By employing the configuration described above, it is possible to provide an image forming apparatus capable of shortening the FPOT while suppressing the power consumption by the image forming apparatus.

The present embodiment has been described for the case where the motor 402 drives the pickup roller 19 and the motor 403 drives the discharge roller 30, but this is merely an example. For example, the motor 402 may drive at least one of the transport rollers upstream of the transfer roller pair 28, and the motor 403 may drive at least one of the transport rollers downstream of the transfer roller pair 28. That is, excitation of windings may be maintained for at least one of the plurality of motors driving the transport rollers upstream of the transfer roller pair 28 until a specific time Td elapses since the end of the print job 1.

In the present embodiment, the motor 402 is configured to drive the pickup roller 19, but, for example, the motor 402 may be configured to drive the pickup roller 19 and the transport roller 39. That is, the motor 402 may be configured to drive a plurality of transport rollers including the pickup roller 19.

Although in the present embodiment, the motor 402 drives the pickup roller 19, the motor 402 may drive, for example, the pickup roller 43.

In the vector control according to the first embodiment and the second embodiment, the motors 402 and 403 are controlled by performing speed feedback control, but the control method is not limited to the speed feedback control. For example, the motors 402 and 403 may be controlled by feeding back the rotation phase θ of the rotors of the motors 402 and 403.

In the first embodiment and the second embodiment, a brushless DC motor is used as the motor for driving the load, but other types of motors such as a stepping motor, a DC motor, or the like may be used. The number of winding phases of the motor is not limited to three (U phase, V phase, and W phase), and the motor may have another number of winding phases.

In the first embodiment and the second embodiment, the CPU 151a may have the function of the motor control apparatus 157.

In the first embodiment and the second embodiment, the operation of detecting the stop position of the motor is performed in the initial operation, but the content of the initial operation is not limited to the detection of the stop position of the motor. For example, an operation of exciting a specific phase of the motor and pulling the rotor into this specific phase may be performed in the initial operation.

Note that the photosensitive drum, the charger, the developer, the transfer roller, the transfer belt and the like are included in the image forming unit.

According to the present disclosure, it is possible to provide an image forming apparatus capable of shortening the FPOT.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-040472 filed Mar. 12, 2021, which is hereby incorporated by reference herein in its entirety.

What is claimed is:

1. An image forming apparatus comprising:
   a stacking unit on which a recording medium is to be stacked;
   a pickup roller configured to feed the recording medium stacked on the stacking unit;
   a motor configured to drive the pickup roller;
   an image forming unit configured to perform image forming to form an image on the recording medium fed by the pickup roller;
   an operation unit configured to be used by a user to set a condition of the image forming performed by the image forming unit;
   a receiving unit configured to receive an instruction to start forming the image by the image forming unit; and
   a controller configured to perform control,
   wherein, in a case where the operation unit is operated before the receiving unit receives the instruction in a state where a winding of the motor is not excited, the controller performs control to execute an initial operation to supply current to the winding of the motor in a stop state in which a rotor of the motor is at stop and to determine in the initial operation a phase of the rotor having been in the stop state based on the current flowing through the winding, wherein, in a case where the receiving unit receives the instruction after the initial operation, the controller performs control to control the current to be supplied to the winding such that the rotor having been in the stop state rotates based on the phase determined in the initial operation, and wherein the controller starts driving the motor in a first control mode in which the controller controls the current to be supplied to the winding based on the current having a predetermined magnitude, based on the phase determined in the initial operation.

2. The image forming apparatus according to claim 1, wherein the controller controls the current to be supplied to the winding such that the rotor is held in a first phase during a period from a time at which the phase is determined in the initial operation until a predetermined time elapses, and wherein, in a case where the instruction is not received by the receiving unit in the period, the controller releases the holding of the rotor.

3. The image forming apparatus according to claim 1, wherein the motor is a first motor and the controller is a first controller, the image forming apparatus further comprising:

a conveyance roller configured to convey the recording medium fed by the pickup roller;

a second motor configured to drive the conveyance roller; and a second controller configured perform control, wherein, in the case where the receiving unit receives the instruction, the second controller performs control to execute a second initial operation to supply current to a winding of the second motor in a second stop state in which a rotor of the second motor is at stop and to determine in the second initial operation a phase of the rotor of the second motor having been in the second stop state based on the current flowing through the winding of the second motor, and wherein the second controller performs control to control the current to be supplied to the winding of the second motor such that the rotor of the second motor having been in the second stop state rotates based on the phase determined in the second initial operation.

4. The image forming apparatus according to claim 3, wherein the conveyance roller is a discharge roller configured to discharge the recording medium outside of the image forming apparatus.

5. The image forming apparatus according to claim 1, wherein the motor is a brushless direct current (DC) motor.

6. The image forming apparatus according to claim 1, further comprising:

a detector configured to detect the current flowing through the winding; and a phase determiner configured to determine a rotation phase of the rotor being rotated based on the current detected by the detector, wherein, after the controller starts driving the motor in the first control mode, the controller switches a control mode for driving the motor from the first control mode to a second control mode in which the controller controls the current to be supplied to the winding based on a torque current component and an excitation current component, wherein the torque current component is a current component represented in a rotating coordinate system based on the rotation phase determined by the phase determiner and is the current component causing a generation of a torque applied to the rotor, and wherein the excitation current component is a current component represented in the rotating coordinate system and affecting a strength of a magnetic flux penetrating the winding.

7. The image forming apparatus according to claim 6, wherein, after the controller starts driving the motor in the first control mode, the controller switches the control mode for driving the motor from the first control mode to the second control mode in a case where a value corresponding to a rotation speed of the rotor becomes larger than a predetermined value.

8. The image forming apparatus according to claim 6, wherein, in the second control mode, the controller controls the current to be supplied to the winding such that a deviation between a value of the torque current component detected by the detector and a target value of the torque current component becomes small, and wherein the target value of the torque current component is set such that a deviation between the rotation phase determined by the phase determiner and a command phase indicating a target phase of the rotation phase of the rotor becomes small.

9. The image forming apparatus according to claim 6, further comprising a speed determiner configured to determine a rotation speed of the rotor, wherein, in the second control mode, the controller controls the current supplied to the winding such that a deviation between a value of the torque current component detected by the detector and a target value of the torque current component becomes small, and wherein the target value of the torque current component is set such that a deviation between the rotation speed determined by the speed determiner and a command speed indicating a target speed of the rotation speed of the rotor becomes small.

10. An image forming apparatus comprising:

a stacking unit on which a recording medium is to be stacked;

a pickup roller configured to feed the recording medium stacked on the stacking unit;

a motor configured to drive the pickup roller;

an image forming unit configured to perform image forming to form an image on the recording medium fed by the pickup roller; a sensor configured to detect an object;

a receiving unit configured to receive an instruction to start forming the image by the image forming unit; and a controller configured to perform control, wherein, in a case where the sensor detects the object before the receiving unit receives the instruction in a state where a winding of the motor is not excited, the controller performs control to execute an initial operation to supply current to the winding of the motor in a stop state in which a rotor of the motor is at stop and to determine in the initial operation a phase of the rotor having been in the stop state based on the current flowing through the winding, wherein, in a case where the receiving unit receives the instruction after the initial operation, the controller performs control to control the current to be supplied to the winding such that the rotor having been in the stop state rotates based on the phase determined in the initial operation, and wherein the controller starts driving the motor in a first control mode in which the controller controls the current to be supplied to the winding based on the current having a predetermined magnitude, based on the phase determined in the initial operation.

11. The image forming apparatus according to claim 10, wherein the controller controls the current to be supplied to the winding such that the rotor is held in a first phase during a period from a time at which the phase is determined in the initial operation until a predetermined time elapses, and
wherein, in a case where the instruction is not received by the receiving unit in the period, the controller releases the holding of the rotor.

12. The image forming apparatus according to claim 10, wherein the motor is a first motor and the controller is a first controller, the image forming apparatus further comprising:
a conveyance roller configured to convey the recording medium fed by the pickup roller;
a second motor configured to drive the conveyance roller; and
a second controller configured perform control,
wherein, in the case where the receiving unit receives the instruction, the second controller performs control to execute a second initial operation to supply current to a winding of the second motor in a second stop state in which a rotor of the second motor is at stop and to determine in the second initial operation a phase of the rotor of the second motor having been in the second stop state based on the current flowing through the winding of the second motor, and
wherein the second controller performs control to control the current to be supplied to the winding of the second motor such that the rotor of the second motor having been in the second stop state rotates based on the phase determined in the second initial operation.

13. The image forming apparatus according to claim 12, wherein the conveyance roller is a discharge roller configured to discharge the recording medium outside of the image forming apparatus.

14. The image forming apparatus according to claim 10, wherein the motor is a brushless direct current (DC) motor.

15. The image forming apparatus according to claim 14, further comprising:
a detector configured to detect the current flowing through the winding; and
a phase determiner configured to determine a rotation phase of the rotor being rotated based on the current detected by the detector,
wherein, after the controller starts driving the motor in the first control mode, the controller switches a control mode for driving the motor from the first control mode to a second control mode in which the controller controls the current to be supplied to the winding based on a torque current component and an excitation current component,
wherein the torque current component is a current component represented in a rotating coordinate system based on the rotation phase determined by the phase determiner and is the current component causing a generation of a torque applied to the rotor, and
wherein the excitation current component is a current component represented in the rotating coordinate system and affecting a strength of a magnetic flux penetrating the winding.

16. The image forming apparatus according to claim 15, wherein, after the controller starts driving the motor in the first control mode, the controller switches the control mode for driving the motor from the first control mode to the second control mode in a case where a value corresponding to a rotation speed of the rotor becomes larger than a predetermined value.

17. The image forming apparatus according to claim 15, wherein, in the second control mode, the controller controls the current to be supplied to the winding such that a deviation between a value of the torque current component detected by the detector and a target value of the torque current component becomes small, and
wherein the target value of the torque current component is set such that a deviation between the rotation phase determined by the phase determiner and a command phase indicating a target phase of the rotation phase of the rotor becomes small.

18. The image forming apparatus according to claim 15, further comprising a speed determiner configured to determine a rotation speed of the rotor,
wherein, in the second control mode, the controller controls the current supplied to the winding such that a deviation between a value of the torque current component detected by the detector and a target value of the torque current component becomes small, and
wherein the target value of the torque current component is set such that a deviation between the rotation speed determined by the speed determiner and a command speed indicating a target speed of the rotation speed of the rotor becomes small.

* * * * *